United States Patent
Rodgers (10) Patent No.: US 8,460,755 B2
(45) Date of Patent: Jun. 11, 2013

(54) EXTRUSION-BASED ADDITIVE MANUFACTURING PROCESS WITH PART ANNEALING

(75) Inventor: Luke M. B. Rodgers, Inver Grove Heights, MN (US)

(73) Assignee: Stratasys, Inc., Eden Prairie, MN (US)

( * ) Notice: Subject to any disclaimer, the term of this patent is extended or adjusted under 35 U.S.C. 154(b) by 224 days.

(21) Appl. No.: 13/081,956

(22) Filed: Apr. 7, 2011

(65) Prior Publication Data

US 2012/0258250 A1  Oct. 11, 2012

(51) Int. Cl.
*B05D 3/02* (2006.01)

(52) U.S. Cl.
USPC ........ 427/256; 427/271; 427/275; 427/385.5; 427/398.1

(58) Field of Classification Search
None
See application file for complete search history.

(56) References Cited

U.S. PATENT DOCUMENTS

| | | |
|---|---|---|
| 4,397,986 A | 8/1983 | Hornbaker |
| 4,551,369 A | 11/1985 | Belz |
| 4,671,982 A | 6/1987 | Belz |
| 4,870,148 A | 9/1989 | Belz et al. |
| 4,886,856 A | 12/1989 | Chen et al. |
| 5,121,329 A | 6/1992 | Crump |
| 5,303,141 A | 4/1994 | Batchelder et al. |
| 5,317,043 A | 5/1994 | Gass |
| 5,322,878 A | 6/1994 | Deibig et al. |
| 5,336,755 A | 8/1994 | Pape |
| 5,340,433 A | 8/1994 | Crump |
| 5,346,955 A | 9/1994 | Sasse et al. |
| 5,378,751 A | 1/1995 | Deibig et al. |
| 5,402,351 A | 3/1995 | Batchelder et al. |
| 5,474,719 A | 12/1995 | Fan et al. |
| 5,503,785 A | 4/1996 | Crump et al. |
| 5,653,925 A | 8/1997 | Batchelder |
| 5,695,707 A | 12/1997 | Almquist et al. |
| 5,764,521 A | 6/1998 | Batchelder et al. |
| 5,863,885 A | 1/1999 | Ruggieri et al. |
| 5,866,058 A | 2/1999 | Batchelder et al. |
| 5,939,008 A | 8/1999 | Comb et al. |
| 6,022,207 A | 2/2000 | Dahlin et al. |
| 6,067,480 A | 5/2000 | Stuffle et al. |
| 6,070,107 A | 5/2000 | Lombardi et al. |
| 6,129,872 A | 10/2000 | Jang |
| 6,165,406 A | 12/2000 | Jang et al. |
| 6,175,422 B1 | 1/2001 | Penn et al. |

(Continued)

FOREIGN PATENT DOCUMENTS

| | | |
|---|---|---|
| EP | 0928316 A1 | 7/1999 |
| GB | 816016 | 7/1959 |
| WO | WO 2006022528 A | 3/2006 |
| WO | WO-2010/045147 A2 | 4/2010 |

OTHER PUBLICATIONS

International Search Report and Written Opinion for International Patent Application No. PCT/US2012/032298 dated Aug. 1, 2012.

(Continued)

*Primary Examiner* — Erma Cameron
(74) *Attorney, Agent, or Firm* — Brian R. Morrison; Westman, Champlin & Kelly, P.A.

(57) ABSTRACT

A method for building a three-dimensional part, the method comprising providing a printed three-dimensional part and support structure, where the support structure comprises at least two polymers having different glass transition temperatures. The method also comprises annealing the three-dimensional part.

18 Claims, 6 Drawing Sheets

U.S. PATENT DOCUMENTS

| | | | |
|---|---|---|---|
| 6,228,923 | B1 | 5/2001 | Lombardi et al. |
| 6,572,807 | B1 | 6/2003 | Fong |
| 6,645,412 | B2 | 11/2003 | Priedeman, Jr. et al. |
| 6,713,125 | B1 * | 3/2004 | Sherwood et al. ............ 427/157 |
| 6,722,872 | B1 | 4/2004 | Swanson et al. |
| 6,790,403 | B1 | 9/2004 | Priedeman, Jr. et al. |
| 6,814,907 | B1 | 11/2004 | Comb |
| 6,907,307 | B2 | 6/2005 | Chen et al. |
| 6,923,634 | B2 | 8/2005 | Swanson et al. |
| 6,998,087 | B1 * | 2/2006 | Hanson et al. ............... 264/308 |
| 7,077,638 | B2 | 7/2006 | Leyden et al. |
| 7,236,166 | B2 | 6/2007 | Zinniel et al. |
| 7,255,821 | B2 | 8/2007 | Priedeman, Jr. et al. |
| 7,648,609 | B2 | 1/2010 | Leder et al. |
| 7,754,807 | B2 * | 7/2010 | Priedeman et al. ............ 524/556 |
| 2003/0090752 | A1 | 5/2003 | Rosenberger et al. |
| 2004/0222561 | A1 | 11/2004 | Hopkins |
| 2005/0004282 | A1 | 1/2005 | Priedeman, Jr. et al. |
| 2005/0103360 | A1 | 5/2005 | Tafoya |
| 2005/0129941 | A1 | 6/2005 | Comb et al. |
| 2005/0133155 | A1 | 6/2005 | Leder et al. |
| 2005/0173838 | A1 | 8/2005 | Priedeman, Jr. et al. |
| 2006/0158456 | A1 | 7/2006 | Zinniel et al. ................. 345/589 |
| 2007/0003656 | A1 | 1/2007 | LaBossiere et al. |
| 2007/0228590 | A1 | 10/2007 | LaBossiere et al. |
| 2008/0213419 | A1 | 9/2008 | Skubic et al. |
| 2009/0035405 | A1 | 2/2009 | Leavitt |
| 2010/0096072 | A1 | 4/2010 | Hopkins et al. |

OTHER PUBLICATIONS

U.S. Appl. No. 09/269,319, filed Jun. 29, 1999, national stage entry and English language equivalent of WO 98/13423 (PCT/EP97/05273).

LOTADER AX 8840, Copolymer Ethylene—Glycidyl Methacrylate, Arkema Technical Polymers Division, (Jul. 2005), 2 pages.

LOTADER GMA, Arkema, (Jan. 2001), 2 pages.

* cited by examiner

EXTRUSION-BASED ADDITIVE MANUFACTURING PROCESS WITH PART ANNEALING

BACKGROUND

The present disclosure is directed to additive manufacturing techniques for printing three-dimensional (3D) parts. In particular, the present disclosure relates to an additive manufacturing process for printing 3D parts and support structures with extrusion-based additive manufacturing systems.

An extrusion-based additive manufacturing system is used to print a 3D part or model from a digital representation of the 3D part in a layer-by-layer manner by extruding a flowable part material. The part material is extruded through an extrusion tip carried by a print head, and is deposited as a sequence of roads on a substrate in an x-y plane. The extruded part material fuses to previously deposited modeling material, and solidifies upon a drop in temperature. The position of the print head relative to the substrate is then incremented along a z-axis (perpendicular to the x-y plane), and the process is then repeated to form a 3D part resembling the digital representation.

Movement of the print head with respect to the substrate is performed under computer control, in accordance with build data that represents the 3D part. The build data is obtained by initially slicing the digital representation of the 3D part into multiple horizontally sliced layers. Then, for each sliced layer, the host computer generates a tool path for depositing roads of the part material to print the 3D part.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second extrusion tip pursuant to the generated geometry during the build process. The support material adheres to the part material during fabrication, and is removable from the completed 3D part when the build process is complete.

SUMMARY

An aspect of the present disclosure is directed to a method for printing a three-dimensional part with an extrusion-based additive manufacturing system. The method includes printing a support structure from a support material with the extrusion-based additive manufacturing system using a layer-based additive manufacturing technique, where the support material includes at least two polymers having different glass transition temperatures and that are substantially immiscible with each other. The method also includes, in coordination with the printing of the support structure, printing the three-dimensional part from a part material with the extrusion-based additive manufacturing system using the layer-based additive manufacturing technique. The method further includes heating the printed support structure and the printed three-dimensional part to at least one temperature that is above a glass transition temperature of the part material, and that is below a glass transition temperature of at least one of the polymers of the support material, and cooling the heated support structure and the heated three-dimensional part.

Another aspect of the present disclosure is directed to a method for building a three-dimensional part. The method includes providing a three-dimensional part and a support structure, where the three-dimensional part is printed from a part material using a layer-based additive manufacturing technique, and where the support structure is printed from a support material in coordination with the three-dimensional part using the layer-based additive manufacturing technique. The support material includes a first polymer having a first glass transition temperature, and a second polymer that is substantially immiscible with the first polymer, the second polymer having a second glass transition temperature that is higher than the first glass transition temperature of the first polymer. The method also includes heating the provided three-dimensional part and the support structure to at least one temperature that is above a glass transition temperature of the part material, that is above the first glass transition temperature of the first polymer of the support material, and that is below the second glass transition temperature of the second polymer of the support material. The method further includes cooling the heated three-dimensional part and the heated support structure.

Another aspect of the present disclosure is directed to a method for printing a three-dimensional part with an extrusion-based additive manufacturing system, where the method includes providing a support material to the extrusion-based additive manufacturing system, the support material including a first polymer having a first glass transition temperature and a second polymer having a second glass transition temperature. The method also includes providing a part material to the extrusion-based additive manufacturing system, the part material having a glass transition temperature that is less than the second glass transition temperature of the second polymer of the support material. The method further includes heating a build environment of the extrusion-based additive manufacturing system to at least one temperature that is above the glass transition temperature of the part material, that is above the first glass transition temperature of the first polymer of the support material, and that is below the second glass transition temperature of the second polymer of the support material. The method even further includes printing a support structure in the heated build environment from the support material in coordination with printing the three-dimensional part in the heated build environment from the part material, and cooling the printed support structure and the printed three-dimensional part.

DETAILED DESCRIPTION

The present disclosure is directed to a process for printing a 3D part and support structure, where the support structure at least partially encapsulates the 3D part. The support structure is printed from a support material that compositionally includes at least two polymers having different glass transition temperatures. For example, the support material may include a low-temperature polymer and a high-temperature polymer, where the different polymers are desirably immiscible with each other. Correspondingly, the 3D part is printed from a part material that compositionally includes a polymer having a glass transition temperature, where the glass transition temperature of the part material is lower than a glass transition temperature of at least one of the polymers of the support material. For example, the part material may have a glass transition temperature that is lower than a glass transition temperature of the high-temperature polymer of the support material.

The process also involves an annealing cycle, in which the 3D part and support structure are heated to one or more temperatures that are above the glass transition temperature of the part material, but that are below the glass transition temperature of at least one of the polymers of the support material (e.g., below the glass transition temperature of the high-temperature polymer of the support material). In a first embodiment, the annealing cycle is performed after the 3D part and support structure are printed. In a second embodiment, at least a portion of the annealing cycle may be performed while the 3D part and the support structure are being printed. As discussed below, the annealing cycles are suitable for enhancing interlayer bonding; increasing part strength, elongation, and toughness; reducing porosity; and providing transparent and/or translucent properties.

Unless otherwise indicated, the singular form of "polymer" herein refers to a polymer composition rather than a single polymer molecule. For example, a part material that compositionally includes a first polymer and a second polymer includes one or more polymer molecules of a first polymer composition and one or more polymer molecules of a second polymer composition. Furthermore, the terms "about" and "substantially" are used herein with respect to measurable values and ranges due to expected variations known to those skilled in the art (e.g., limitations and variabilities in measurements). All temperatures referred to herein are based on atmospheric pressure (i.e. one atmosphere).

Figure 1:
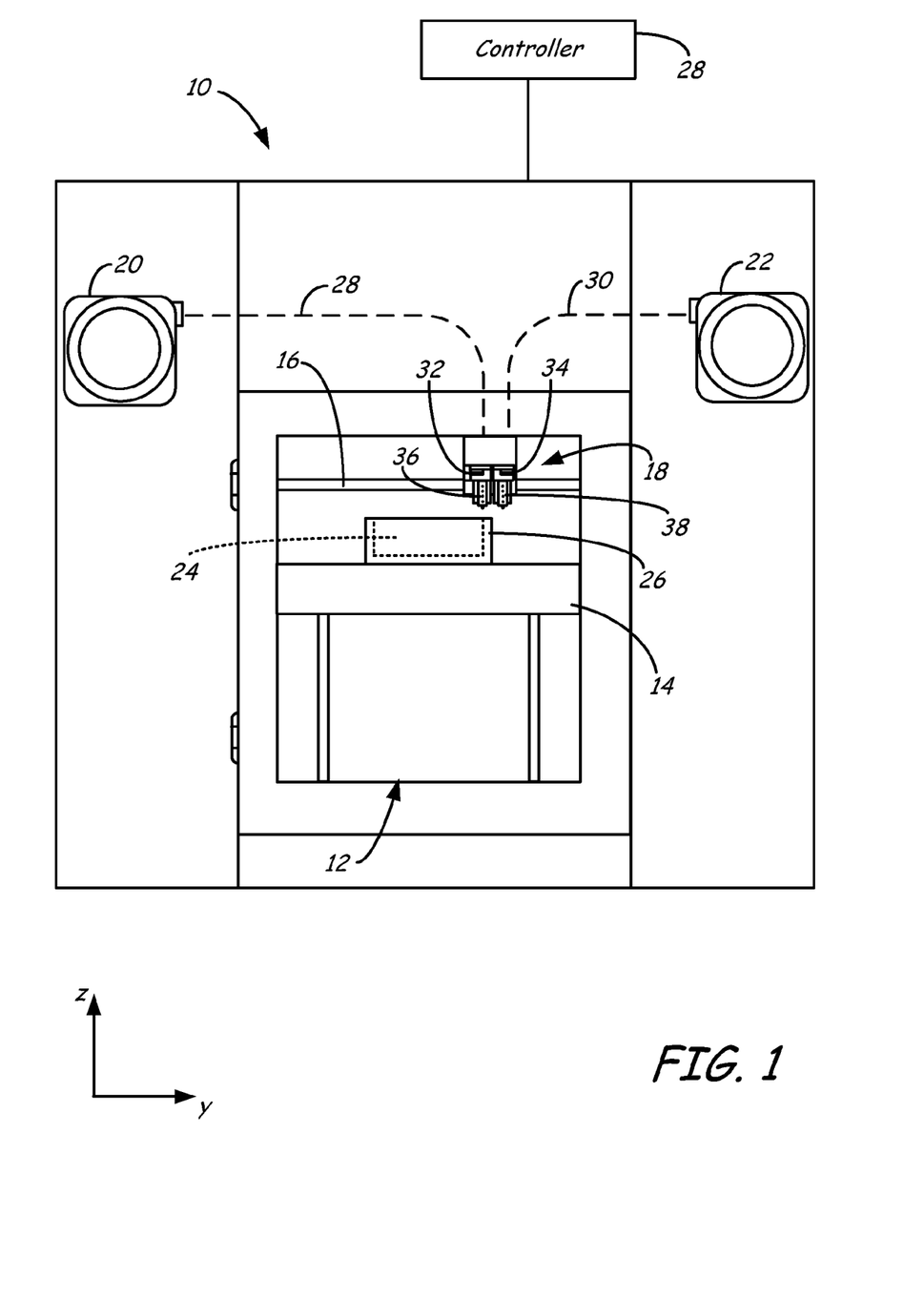
FIG. 1 is a front view of an extrusion-based additive manufacturing system configured to print 3D parts and support structures.

FIG. 1 illustrates system 10, which is example of a suitable extrusion-based additive manufacturing system for building 3D parts and support structures pursuant to the process of the present disclosure. System 10 includes build chamber 12, platen 14, gantry 16, print head 18, and supply sources 20 and 22. Examples of suitable systems for system 10 include extrusion-based additive manufacturing systems, such as those commercially available by Stratasys, Inc., Eden Prairie, Minn. under the trademarks "FUSED DEPOSITION MODELING" and "FDM".

Build chamber 12 contains platen 14, gantry 16, and print head 18 for printing a 3D part (referred to as 3D part 24) and a corresponding support structure (referred to as support structure 26). The environment within build chamber 12, at least in the region of 3D part 24 and support structure 26, may be heated to one or more temperatures while printing 3D part and support structure 26. For example, build chamber 12 may be heated to, and maintained at, one or more temperatures that are in a window between the solidification temperature and the creep relaxation temperature of the part material and/or the support material. This reduces the risk of mechanically distorting (e.g., curling) 3D part 24 and support structure 26, where the creep relaxation temperature of the part material is proportional to the glass transition temperature of the part material. Examples of suitable techniques for determining the creep relaxation temperatures of the part and support materials are disclosed in Batchelder et al., U.S. Pat. No. 5,866,058.

Additionally, the environment within build chamber 12, at least in the region of 3D part 24 and support structure 26, may be heated to one or more elevated temperatures to anneal 3D part 24. As discussed below, this involves heating the environment within build chamber 12, at least in the region of 3D part 24 and support structure 26, to one or more temperatures above the glass transition temperature of the part material of 3D part 24.

Platen 14 is a platform on which 3D part 24 and support structure 26 are built, and desirably moves along a vertical z-axis based on signals provided from computer-operated controller 28. Gantry 16 is a guide rail system that is desirably configured to move print head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and print head 18 may be configured to move along the z-axis. Other similar arrangements may also be used such that one or both of platen 14 and print head 18 are moveable relative to each other.

Print head 18 is supported by gantry 16 for printing 3D part 24 and support structure 26 on platen 14 in a layer-by-layer manner, based on signals provided from controller 28. In the embodiment shown in FIG. 1, print head 18 is a dual-tip extrusion head configured to deposit part and support materials from supply source 20 and supply source 22, respectively. Examples of suitable extrusion heads for print head 18 include those disclosed in Crump et al., U.S. Pat. No. 5,503,785; Swanson et al., U.S. Pat. No. 6,004,124; LaBossiere, et al., U.S. Pat. No. 7,604,470; Leavitt, U.S. Pat. No. 7,625,200; and U.S. Publication No. 2012/0162314. Furthermore, system 10 may include a plurality of print heads 18 for depositing part and/or support materials from one or more tips.

The part material is supplied to print head 18 from supply source 20 via feed line 28, thereby allowing print head 18 to deposit the part material to print 3D part 24. Correspondingly, the support material is supplied to print head 18 from supply source 30 via feed line 30, thereby allowing print head 18 to deposit the support material to print support structure 26.

The part and support materials may be provided to system 10 in a variety of different media. Commonly, the materials may be supplied in the forms of continuous filaments. For example, in system 10, the part and support materials may be provided as continuous filament strands fed respectively from supply sources 20 and 22, as disclosed in Swanson et al., U.S. Pat. No. 6,923,634; Comb et al., U.S. Pat. No. 7,122,246; Taatjes et al, U.S. Patent Application Publication Nos. 2010/

0096485 and 2010/0096489; and Swanson et al., U.S. Patent Application Publication No. 2010/0283172. Examples of suitable average diameters for the filament strands of the part and support materials range from about 1.27 millimeters (about 0.050 inches) to about 3.0 millimeters (about 0.120 inches).

As shown, print head 18 includes drive mechanisms 32 and 34, and liquefier assemblies 36 and 38. During a print operation, gantry 16 moves print head 18 around in the horizontal x-y plane within build chamber 12, and drive mechanisms 32 and 34 are directed to intermittently feed the part and support materials from supply sources 20 and 32 through liquefier assemblies 36 and 38.

Examples of suitable drive mechanisms for drive mechanisms 32 and 34, and liquefier assemblies for liquefier assemblies 36 and 38 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and U.S. Publication No. 2012/0162314. In alternative embodiments, print head 18 may function as a multiple-stage screw pump, as disclosed in Batchelder et al., U.S. Pat. No. 5,764,521; and Skubic et al., U.S. Pat. No. 7,891,964.

Figure 2:
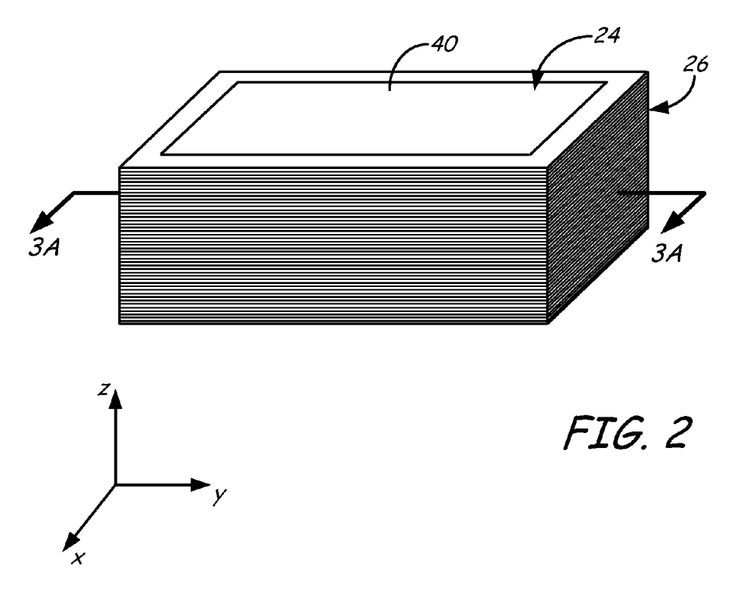
FIG. 2 is a perspective view of a 3D part and support structure printed with the extrusion-based additive manufacturing system, where the support structure partially encapsulates the 3D part.

The received part and support materials are deposited onto platen 14 to print 3D part 24 in coordination with the printing of support structure 26 using a layer-based additive manufacturing technique. As shown in FIG. 2, 3D part 24 is printed as a series of successive layers of the part material, and support structure 26 is printed as a series of successive layers of the support material in coordination with the printing of 3D part 24.

3D part 24 is an example of a simple block-shaped part having top surface 40, four lateral surfaces (not shown in FIG. 2), and a bottom surface (not shown in FIG. 2). Support structure 26 is desirably deposited to at least partially encapsulate the layers of 3D part 24. For example, support structure 26 may be printed to encapsulate the lateral surfaces and the bottom surface of 3D part 24, as shown.

In alternative examples, system 10 may print 3D parts having a variety of different geometries. In these examples, system 10 may also print corresponding support structures that at least partially encapsulate the 3D parts, such as at the lateral surfaces and the bottom surfaces of the 3D parts. In such examples, a part orientation may be selected such that the un-encapsulated top surface is the least significant part surface. Additionally, the support structures may provide vertical support along the z-axis for any overhanging regions of the layers of the 3D parts, allowing the 3D parts to be built with a variety of geometries.

Figure 3A:
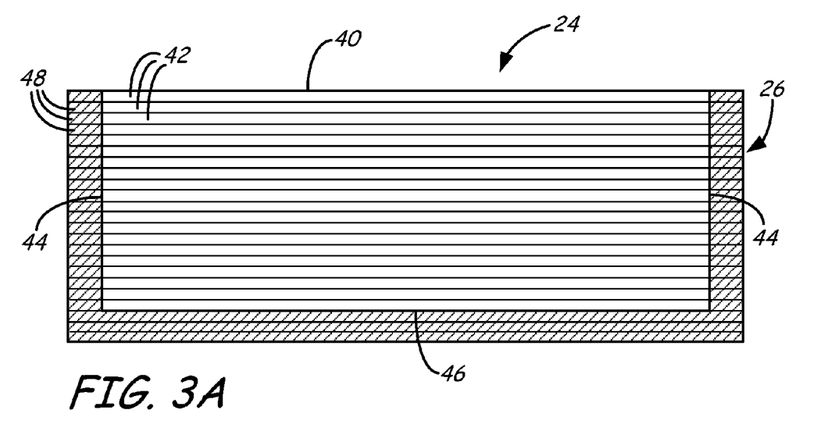
FIGS. 3A-3C are sectional views of Section 3A-3A taken in FIG. 2, depicting a printing and annealing process for building the 3D part and support structure.
Figure 3B:
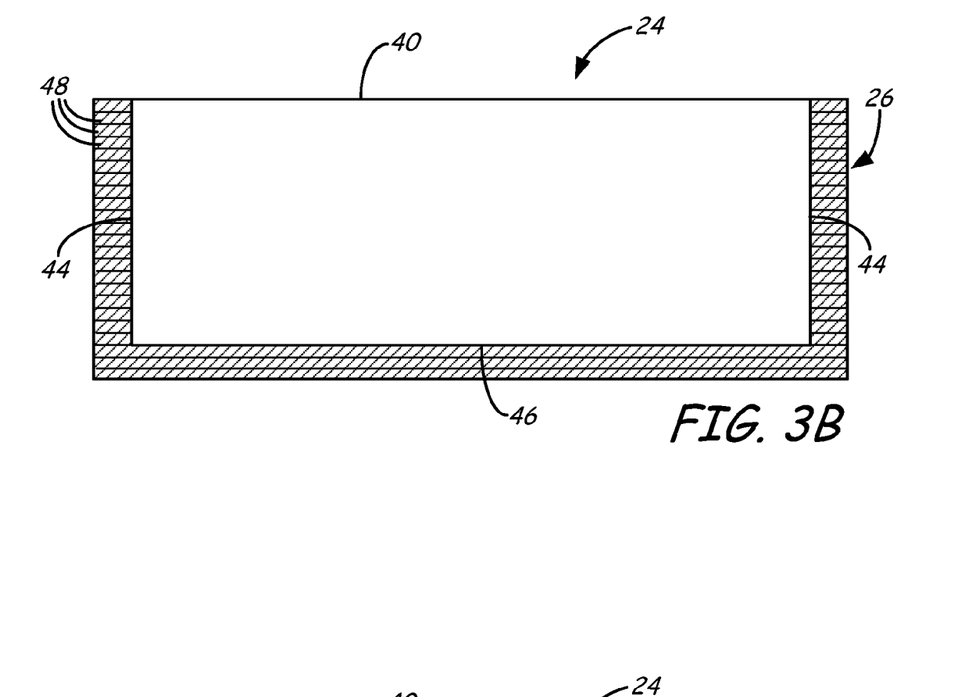
Figure 3C:
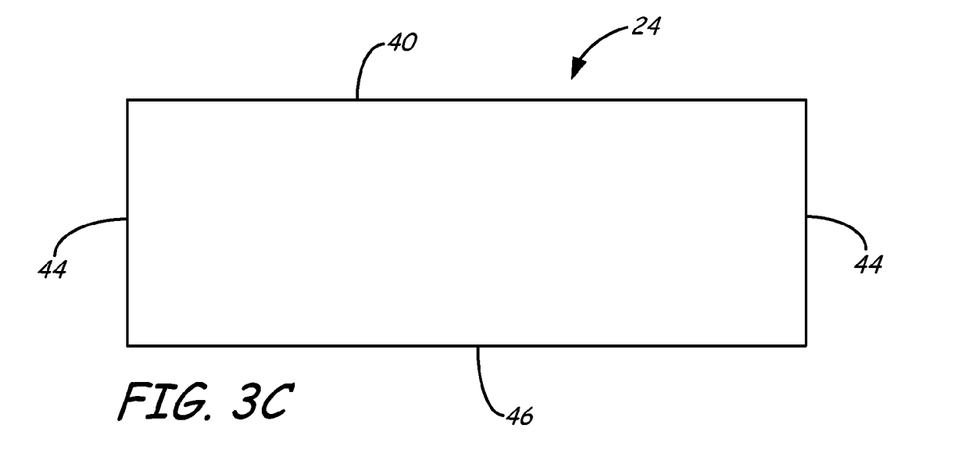

FIGS. 3A-3C illustrate the process of the present disclosure for printing and annealing 3D part 24 and support structure 26 with system 10. While the process is described herein with reference to 3D part 24 and support structure 26, the process is also suitable for printing and annealing 3D parts and support structures having a variety of geometries. As shown in FIG. 3A, each layer of 3D part 24 is printed in a series of layers 42 to define the geometry of 3D part 24, having top surface 40, lateral surfaces 44, and bottom surface 46.

As discussed above, 3D part 24 is printed from a part material that compositionally includes a polymer having a glass transition temperature $T_g(p)$. Examples of suitable part materials include thermoplastic materials, such as acrylonitrile-butadiene-styrene (ABS) copolymers, polycarbonates, polysulfones, polyethersulfones, polyphenylsulfones, polyetherimides, polyamides modified variations thereof (e.g., ABS-M30 copolymers), polystyrene, polypropylenes, copolyesters, and blends thereof.

In some embodiments, the part material may also includes one or more additives, such as plasticizers, rheology modifiers, inert fillers, colorants, stabilizers, and combinations thereof. In embodiments in which the part material includes additional additives, examples of suitable combined concentrations of the additional additives in the part material range from about 1% by weight to about 10% by weight, with particularly suitable concentrations ranging from about 1% by weight to about 5% by weight, based on the entire weight of the part material.

Each layer of support structure 26 is printed in a series of layers 48 in coordination with the printing of layers 42 of 3D part 24, where the printed layers 48 of support structure 26 encapsulate lateral surfaces 44 and bottom surface 46 of 3D part 24. In the shown example, however, top surface 40 is not encapsulated by layers 48 of support structure 26. Additionally, in the shown embodiment, the layer-based additive manufacturing technique used to print layers 42 and 48 is performed to provide layers 42 and 48 having substantially the same layer thicknesses. In an alternative embodiment, the layer-based additive manufacturing technique prints multiple layers 48 for each layer 42, such that the layer thicknesses of each layer 48 is thinner than the layer thicknesses of each layer 42, as disclosed in Zinniel et al., U.S. Pat. No. 7,236,166.

As also discussed above, support structure 26 is printed from a support material that compositionally includes at least two polymers having different glass transition temperatures, and that maybe substantially immiscible with each other to provide a heterogeneous polymer blend. For example, the support material may include one or more low-temperature polymers that are substantially miscible with each other, and one or more high-temperature polymers that are miscible or substantially miscible with each other, where the low-temperature polymer(s) are desirably immiscible with the high-temperature polymer(s).

For ease of discussion, the support material will be referred to as including a low-temperature polymer having a first glass transition temperature $T_g(s1)$, and a high-temperature polymer having a second glass transition temperature $T_g(s2)$, where the low-temperature polymer and the high-temperature polymer are substantially immiscible with each other, and where $T_g(s2)$ is greater than $T_g(s1)$. However, the support material may alternatively include multiple low-temperature polymers that are substantially miscible with each other to provide the first glass transition temperature $T_g(s1)$ as an average of the individual glass transition temperatures of the multiple low-temperature polymers. Similarly, the support material may also alternatively include multiple high-temperature polymers that are substantially miscible with each other to provide the second glass transition temperature $T_g(s2)$ as an average of the individual glass transition temperatures of the multiple high-temperature polymers.

Examples of suitable differences between the first glass transition temperature $T_g(s1)$ of the low-temperature polymer and the second glass transition temperature $T_g(s2)$ of the high-temperature polymer include temperature differences of at least about 10° C., more desirably by at least about 20° C. In one embodiment, the second glass transition temperature $T_g(s2)$ of the high-temperature polymer is greater than the first glass transition temperature $T_g(s1)$ of the low-temperature polymer by a temperature difference ranging from about 25° C. to about 50° C. In another embodiment, the second glass transition temperature $T_g(s2)$ of the high-temperature polymer is greater than the first glass transition temperature $T_g(s1)$ of the low-temperature polymer by a temperature difference ranging from about 35° C. to about 50° C.

Additionally, as discussed above, the glass transition temperature $T_g(p)$ of the part material is lower than the second glass transition temperature $T_g(s2)$ of the high-temperature polymer of the support material. In some embodiments, the glass transition temperature $T_g(s1)$ of the low-temperature polymer may be the same as or similar to the glass transition temperature $T_g(p)$ of the part material. Examples of suitable differences between the glass transition temperature $T_g(p)$ of the part material and the first glass transition temperature $T_g(s1)$ of the low-temperature polymer include temperature differences less than about 30° C., and more desirably less than about 20° C.

Suitable support materials for building support structure 26 include blends of amorphous thermoplastic polymers, where the low-temperature polymer(s) and the high-temperature polymer(s) are desirably immiscible with each other to provide a heterogeneous polymer blend. Furthermore, suitable support materials may be soluble or at least partially soluble in water and/or an aqueous alkaline solution, which is suitable for removing support structure 26 in a convenient manner without damaging 3D part 24.

Examples of suitable low-temperature polymers for use in the support material include materials commercially available under the trademarks "SR10", "SR20", and "SR30" Soluble Supports from Stratasys, Inc., Eden Prairie, Minn.; and those disclosed in Lombardi et al., U.S. Pat. Nos. 6,070,107 and 6,228,923; Priedeman et al., U.S. Pat. Nos. 6,790,403 and 7,754,807; and Hopkins et al., U.S. Patent Application Publication No. 2010/0096072.

Examples of suitable high-temperature polymers for use in the support material include acrylate and acrylic-acid based materials, such as copolymers polymerized from monomers of carboxylic acids (e.g., acrylic acid and methacrylic acid), ionic salts of carboxylic acids (e.g., neutralized salts of acrylic acid and/or methacrylic acid), alkyl acrylates (e.g., methyl acrylate), alkyl methacrylates (e.g., methyl methacrylate), and combinations thereof. Such copolymers may have number-average molecular weights ranging from about 100,000 grams/mole to about 150,000 grams/mole.

Suitable weight ratios of the high-temperature polymer(s) to the low-temperature polymer(s) in the support material may vary depending on the particular polymers used. The high-temperature polymer(s) desirably constitute at least about 33% by weight of the support material, and the low-temperature polymer(s) desirably constitute at least about 33% by weight of the support material. In some embodiments, the support material includes from about 50% by weight to about 75% by weight of the high-temperature polymer(s), and from about 25% by weight to about 50% by weight of the low-temperature polymer(s). Examples of suitable weight ratios of the high-temperature polymer(s) to the low-temperature polymer(s) range from about 1:3 to about 4:1, more desirably from about 1:1 to about 3:1, and even more desirably from about 3:2 to about 3:1.

After the print operation is complete, 3D part 24 and support structure 26 may then undergo an annealing cycle. As discussed below, this involves increasing the temperature of the environment within build chamber 12, at least in the region of 3D part 24 and support structure 26, to one or more elevated temperatures that are above the glass transition temperature $T_g(p)$ of the part material, that are above the glass transition temperature $T_g(s1)$ of the low-temperature polymer of the support material, and that are below the glass transition temperature $T_g(s2)$ of the high-temperature polymer of the support material.

As shown in FIG. 3B, the elevated temperature within build chamber 12 allows the part material of layers 42 to flow and conform to the dimensions of support structure 26. The low-temperature polymer of support structure 26 also softens under the elevated temperature. However, the high-temperature polymer of support structure 26 maintains its modulus, and hence its shape, at the elevated temperature. The immiscibility of the different polymers of the support material creates a matrix of the high-temperature polymer in the softened low-temperature polymer. In this manner, the low-temperature polymer may function as a flexibilizer for the high-temperature polymer, reducing the brittleness of support structure 26.

After maintaining build chamber 12 at the elevated temperature for a suitable duration, the temperature may be gradually reduced along a temperature profile to cool and solidify 3D part 24. The reflowing and cooling of the part material accordingly reduces porosity in 3D part 24, increases interlayer bonding, and produces isotropic properties. This may accordingly increase the strength, elongation, toughness, and modulus of 3D part 24. Additionally, in embodiments in which the part material compositionally includes a clear polymer, 3D part 24 may exhibit transparent and/or translucent properties. Such transparent/translucent properties are typically unattainable with extrusion-based additive manufacturing systems due to the road-based layers and porosity that are produced, which otherwise scatter any penetrating light.

As shown in FIG. 3C, after the annealing cycle is completed, the resulting 3D part 24/support structure 26 may be removed from build chamber 12, and support structure 26 may be removed from 3D part 24. For example, in embodiments in which the support material is at least partially soluble in water or an aqueous alkaline solution, the resulting 3D part 24/support structure 26 may be immersed in water and/or an aqueous alkaline solution bath to dissolve support structure 26 apart from 3D part 24. The resulting 3D part 24 accordingly exhibits bulk, isotropic properties, with dimensions corresponding to the encapsulation dimensions of support structure 26 prior to removal.

Figure 4A:
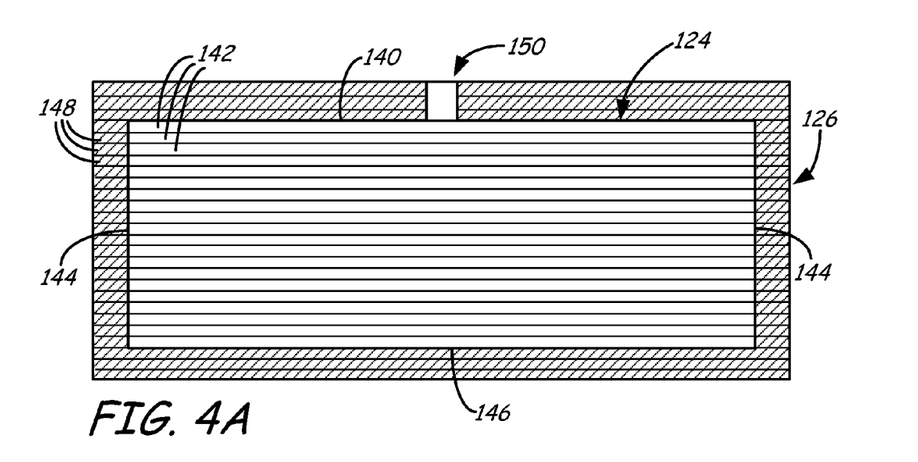
FIGS. 4A-4D are alternative sectional views of Section 3A-3A taken in FIG. 2, depicting an alternative printing and annealing process for building the 3D part and support structure.

FIGS. 4A-4D illustrate an alternative process of the present disclosure for printing and annealing 3D parts and support structures with system 10 (shown in FIG. 1), where corresponding reference labels are increased by "100". As shown in FIG. 4A, 3D part 124 may be printed in the same manner as discussed above for 3D part 24 with layers 142, and includes top surface 140, lateral surfaces 144, and bottom surface 146. Similarly support structure 126 may be printed in the same manner as discussed above for support structure 26 with layers 148.

However, in this example, support structure 126 also partially encapsulates top surface 140, providing sprue hole 150. After the print operation is complete, 3D part 124 and support structure 126 may then undergo an annealing cycle. This involves increasing the temperature of the environment within build chamber 12, at least in the region of 3D part 124 and support structure 126, to one or more elevated temperatures that are above the glass transition temperature $T_g(p)$ of the part material, that are above the glass transition temperature $T_g(s1)$ of the low-temperature polymer of the support material, and that are below the glass transition temperature $T_g(s2)$ of the high-temperature polymer of the support material.

Figure 4B:
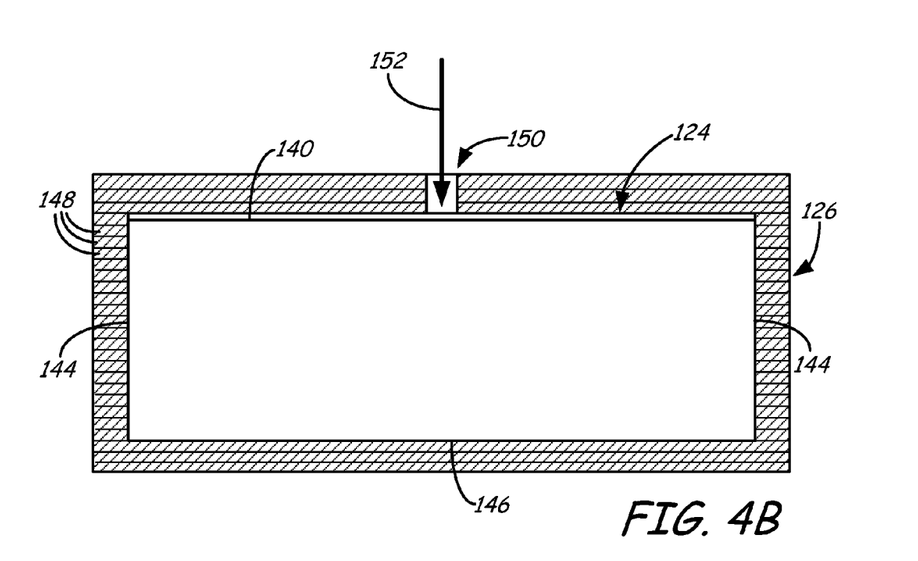

As shown in FIG. 4B, the elevated temperature within build chamber 12 allows the part material of roads 140 to flow and conform to the dimensions of support structure 126. The low-temperature polymer of support structure 126 also softens under the elevated temperature. However, the high-temperature polymer of support structure 126 maintains its modulus, and hence its shape, at the elevated temperature, as discussed above.

After maintaining build chamber 12 at the elevated temperature for a suitable duration, the temperature may be gradually reduced along a temperature profile to cool and solidify 3D part 124. In comparison to 3D part 24 as shown in FIG. 3B, in some situations, the part material may contract and shrink upon cooling, thereby reducing the dimensions of 3D part 124. This is illustrated by top surface 140 being located below the overhanging top surface of support structure 126.

To compensate for this shrinkage of 3D part 124, print head 18 may extrude additional amounts of the part material through spue hole 150, as illustrated by arrow 152. This additional extrusion may be performed during the heating portion of the annealing cycle, while build chamber 12 is maintained at the elevated temperature, and/or during the subsequent cooling portion of the annealing cycle.

Figure 4C:
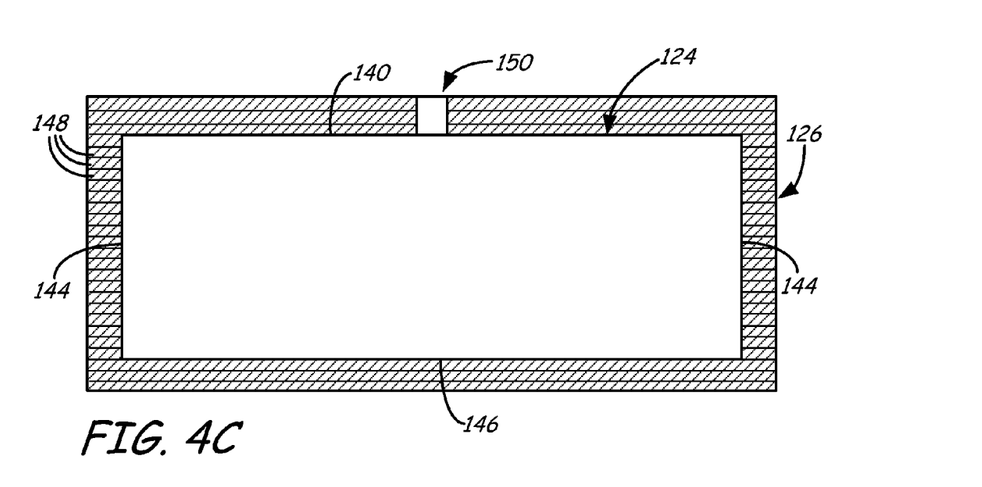

As shown in FIG. 4C, the additional extrusion may fill in any voids between 3D part 124 and support structure 126 to attain the originally desired dimensions for 3D part 124. As discussed above, the annealing cycle accordingly reduces porosity in 3D part 124, increases interlayer bonding, and produces isotropic properties.

Figure 4D:
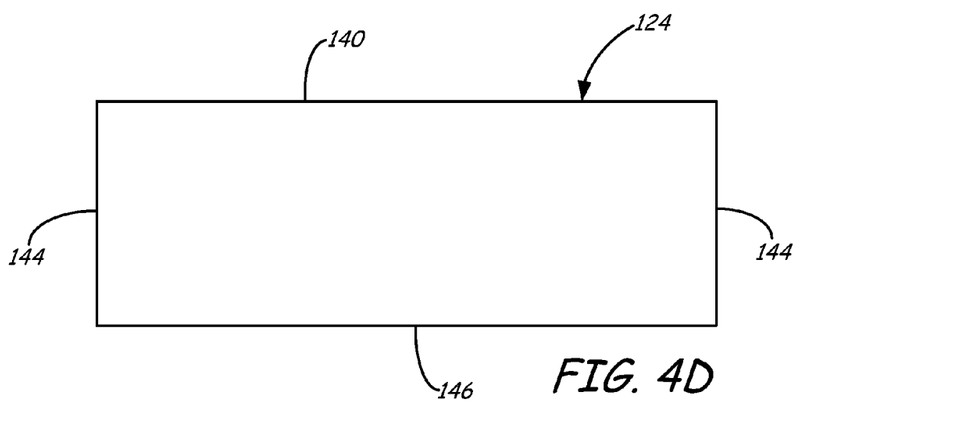

As shown in FIG. 4D, after the annealing cycle is completed, the resulting 3D part 124/support structure 126 may be removed from build chamber 12, and support structure 126 may be removed from 3D part 124. The resulting 3D part 124 accordingly exhibits bulk, isotropic properties, with dimensions corresponding to the encapsulation dimensions of support structure 126 prior to removal.

Figure 5:
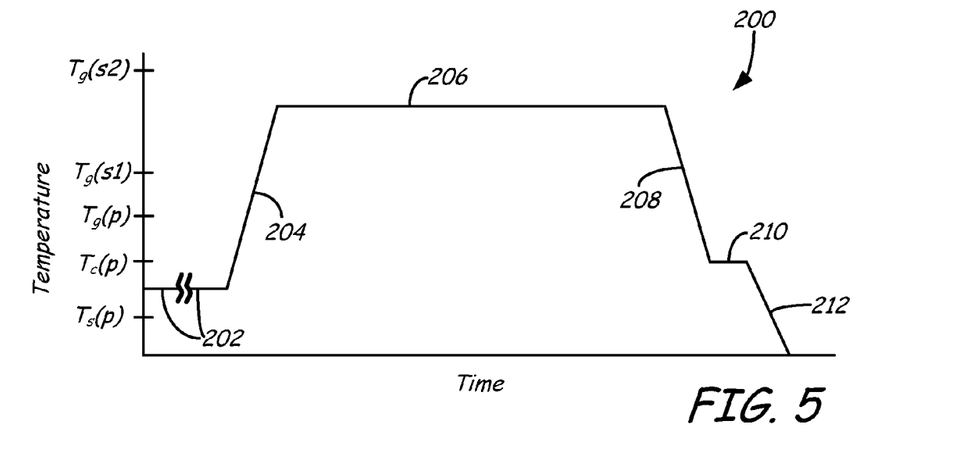
FIG. 5 is a graphical illustration of a first temperature profile for printing and annealing a 3D part and support structure, where the 3D part and support structure are printed and annealed in a single back-to-back process.
Figure 6:
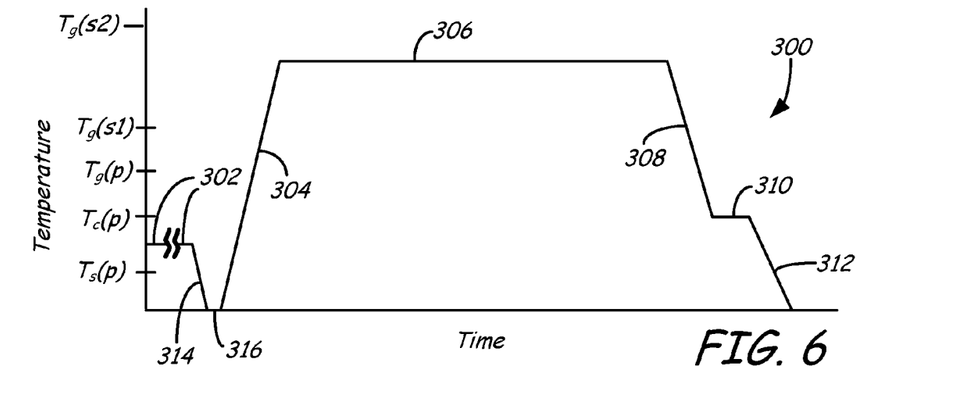
FIG. 6 is a graphical illustration of a second temperature profile for printing and annealing a 3D part and support structure, where the 3D part and support structure are printed and annealed in separate processes that are separated by a cooling step.
Figure 7:
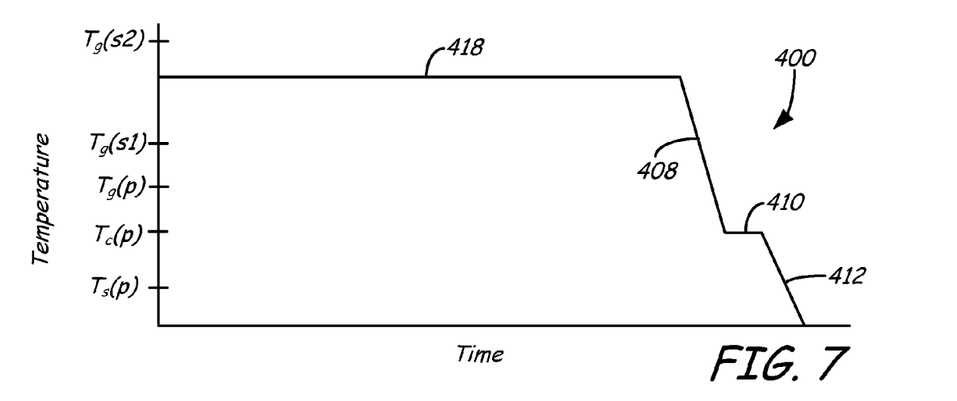
FIG. 7 is a graphical illustration of a third temperature profile for printing and annealing a 3D part and support structure, where the 3D part and support structure are printed and annealed in a simultaneous manner.

FIGS. 5-7 illustrate example heating and cooling profiles for printing and annealing 3D parts and support structures with system 10 (shown in FIG. 1). FIG. 5 illustrates profile 200, which is a suitable profile for printing and annealing 3D parts entirely within build chamber 12 a single back-to-back process. As shown, profile 200 includes segment 202, during which build chamber 12 is heated and maintained at one or more temperatures that are in a window between the solidification temperature $T_s(p)$ of the part material and the creep relaxation temperature $T_c(p)$ of the part material for performing the print operation to build the 3D part and support structure. As discussed above, the support structure is printed to at least partially encapsulate the 3D part.

After the print operation is completed, build chamber 12 may then heated to one or more elevated temperatures over a heating ramp profile, as depicted by segment 204. Examples of suitable heating ramp ramp profiles for segment 202 include temperature increases ranging from about 5° C./minute to about 20° C./minute. As discussed above, the elevated temperature of build chamber 12 is above the glass transition temperature $T_g(p)$ of the part material and below the second glass transition temperature $T_g(s2)$ of the high-temperature polymer of the support material, as illustrated by segment 206. Additionally, the elevated temperature of build chamber 12 is also above the second glass transition temperature $T_g(s1)$.

Build chamber 12 may be maintained at the elevated temperature for a suitable duration to allow the part material of the 3D part to flow and conform to the dimensions of the support structure. The suitable duration may vary depending on the relative values between the elevated temperature of build chamber 12 and the glass transition temperature $T_g(p)$ of the part material, and on the dimensions of the 3D part and the support structure. Additionally, the elevated temperature and the suitable duration are desirably selected to be low and short enough to prevent the part material from thermally degrading. Examples of suitable durations for segment 206 range from about 30 minutes to about 10 hours. In some embodiments, suitable durations for segment 206 range from about 2 hours to about 5 hours.

As illustrated by segments 208, 210, and 212, the temperature within build chamber 12 may then be gradually reduced along a cool ramp profile to cool and solidify the 3D part. For example, as indicate by segment 208, the temperature may be reduced at a suitable rate until an intermediate temperature is reached. Examples of suitable cooling ramp profiles for segment 208 include temperature decreases ranging from about 5° C./minute to about 15° C./minute.

The intermediate temperature is desirably below the glass transition temperature $T_g(p)$ of the part material (e.g., at the creep relaxation temperature $T_c(p)$ of the part material). As indicated by segment 210, build chamber 12 may be maintained at the intermediate temperature to allow the part material to slowly cool with reduced levels of distortion (e.g., curl). As indicated by segment 212, the temperature within build chamber 12 may then be gradually reduced along an additional cooling ramp profile to cool and solidify 3D part 24 down below the solidification temperature $T_s(p)$ of the part material (e.g., down to 25° C.). Examples of suitable cooling ramp profiles for segment 212 include temperature decreases ranging from about 5° C./minute to about 15° C./minute.

While illustrated with a single intermediate temperature step at segment 210, profile 200 may alternatively include multiple intermediate temperature steps, as desired. After the annealing cycle is completed, the resulting 3D part and support structure may be removed from build chamber 12, and the support structure may be removed from the 3D part. As discussed above, the reflowing and cooling of the part material reduces porosity in the 3D part, increases interlayer bonding, and produces isotropic properties. This may accordingly increase the strength, elongation, toughness, and modulus of the 3D part. Additionally, in embodiments in which the part material compositionally includes a clear polymer, the 3D part may exhibit transparent and/or translucent properties.

FIG. 6 illustrates profile 300, which is also a suitable profile for printing and annealing 3D parts either entirely or partially within build chamber 12. As shown, profile 300 includes segments 302-316, where the steps of segments 302, 306, 308, 310, and 312 may be performed in the same manner as discussed above for steps for segments 202, 206, 208, 210, and 212 of profile 200 (shown in FIG. 5). However, profile 300 also includes a cooling step at segment 314 and, optionally, a delay step at segment 316, between the printing step of segment 302 and the heating step of segment 304.

In this embodiment, after the 3D part and the support structure are printed in build chamber 12, as indicated by segment 302, the 3D part and the support structure may be cooled down to room temperature (e.g., 25° C.) and removed from build chamber 12. This is indicated by segment 314. Examples of suitable cooling ramp profiles for segment 314 include temperature decreases ranging from about 5° C./minute to about 15° C./minute.

If desired, the resulting 3D part and support structure may then be stored and/or transported to another location for the subsequent annealing cycle, as indicated by segment 316. The resulting 3D part and support structure then be placed in an oven (or back into build chamber 12) and heated from room temperature up to the one or more elevated temperatures for the annealing cycle, as indicated by segment 304. Accordingly, the annealing cycles of the present disclosure may be performed as a single back-to-back process with the printing operation in build chamber 12 (as illustrated by profile 200) or as a separate step that is independent of the printing operation (as illustrated by profile 300).

FIG. 7 illustrates profile 400, which is a suitable profile for printing and annealing 3D parts entirely within build chamber 12, where at least a portion of the annealing cycle may be performed while the 3D part and the support structure are being printed. As shown, profile includes segments 408-412 and 418, where the steps of segments 408, 410, and 412 may be performed in the same manner as discussed above for steps of segments 208, 210, and 212 of profile 200 (shown in FIG. 5).

In comparison to the step of segments 202, 204, and 206 of profile 200, however, at segment 318 of profile 400, build chamber 12 is heated to the one or more elevated temperatures prior to or during the printing operation to print the 3D part and the support structure. Accordingly, the layers of the part material may flow and conform to the dimensions of the layers of the support structure during the printing operation, where a given layer of the 3D part is desirably printed after the respective layer of the support structure.

When the printing operation is complete, the temperature within build chamber 12 may then be gradually reduced along a cooling ramp profile to cool and solidify the 3D part, as illustrated by segments 408, 410, and 412. As discussed above for profiles 200 and 300, the reflowing and cooling of the part material reduces porosity in the 3D part, increases interlayer bonding, and produces isotropic properties. This may accordingly increase the strength, elongation, toughness, and modulus of the 3D part. Additionally, in embodiments in which the part material compositionally includes a clear polymer, the 3D part may exhibit transparent and/or translucent properties.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

3D parts and support structures were printed using an extrusion-based additive manufacturing system commercially under the trademarks "FUSED DEPOSITION MODELING" and "FDM" from available Stratasys, Inc., Eden Prairie, Minn. The 3D parts were printed from a part material that compositionally included a copolyester commercially available under the trade designation "EASTAR" 6763 Copolyester from Eastman Chemical Company, Kingsport, Tenn., which had a glass transition temperature $T_g(p)$ of about 80° C.

The support structures were printed from a support material that included a blend of a low-temperature polymer and two high-temperature polymers, where the high-temperature polymers were miscible with each other, but were immiscible with the low-temperature polymer. The low-temperature polymer was an alkaline water-soluble copolymer blend commercially available under the trademark "SR30" Soluble Supports from Stratasys, Inc., Eden Prairie, Minn., which included a terpolymer having a plurality of carboxyl groups, a plurality of phenyl groups, and a plurality of carboxylate ester groups; and a copolymer having a plurality of epoxy groups and a plurality of carboxylate ester groups; and which had a glass transition temperature $T_g(s1)$ of about 110° C. The first high-temperature polymer was a copolymer of methacrylic acid and methyl methacrylate (1:1 ratio), and the second high-temperature polymer copolymer of methacrylic acid and methyl methacrylate (1:2 ratio). The first and second high-temperature polymers each had a glass transition temperature $T_g(s2)$ greater than about 150° C., and a number-average molecular weight of about 125,000 grams/mole. Table 1 lists the weight percent ratios of the components of the support material.

TABLE 1

| Component | Percent by Weight |
| --- | --- |
| Low-temperature terpolymer | 36.05 |
| 1:1 high-temperature copolymer | 54.05 |
| 1:2 high-temperature copolymer | 9.90 |

As shown in Table 1, the support material included about 64% by weight of the high-temperature polymers and about 36% by weight of the low-temperature polymer. Accordingly, the immiscible polymers of the support material provided a glass transition temperature difference (i.e., $T_g(s2)-T_g(s1)$) of more than 40° C.

After each 3D part and support structure were printed, they were removed from the build chamber of the extrusion-based additive manufacturing system and allowed to cool to room temperature for inspection. The resulting 3D part and support structure were then placed in an oven to undergo an annealing cycle. During the annealing cycle, the oven was heated up from 25° C. to 145° C. at a heating ramp rate of 10° C./minute. The oven was then held at 145° C. for a duration of 3.5 hours.

During this step, the elevated temperature within the oven allowed the part material of the 3D part to flow and conform to the dimensions of the support structure. The low-temperature polymer of the support structure also softened under the elevated temperature. However, the high-temperature polymers of the support structure maintained their moduli and shape at the elevated temperature. As discussed above, the immiscibility of the polymers of the support material created a matrix of the high-temperature polymers in the softened low-temperature polymer. As such, the low-temperature polymer functioned as a flexibilizer for the high-temperature polymers, reducing the brittleness of the support structure and allowing the support structure to maintain its structural integrity.

After the heating duration, the oven was then cooled down from 145° C. to 70° C. at a cooling ramp rate of 10° C. The oven was then held at 70° C. for 20 minutes, and then cooled down from 70° C. to 25° C. at a cooling ramp rate of 10° C. After the annealing cycle was completed, the annealed 3D part and support structure were then placed in a support removal tank with a support removal solution commercially available under the trademark "WATERWORKS" from available Stratasys, Inc., Eden Prairie, Minn. This dissolved the support structure from the annealed 3D part.

Each resulting 3D part exhibited isotropic properties with reduced porosity and increased interlayer bonding, and also had clear, translucent properties. Furthermore, the part material did not have any visible thermal degradation. As such, the annealing cycle allowed the part material to flow and conform to the dimensions of the support structure, thereby providing bulk isotropic properties for each of the 3D parts.

Although the present disclosure has been described with reference to several embodiments, workers skilled in the art will recognize that changes may be made in form and detail without departing from the spirit and scope of the disclosure.

The invention claimed is:

1. A method for printing a three-dimensional part with an extrusion-based additive manufacturing system, the method comprising:

printing a support structure from a support material with the extrusion-based additive manufacturing system using a layer-based additive manufacturing technique, wherein the support material comprises at least two polymers comprising a first polymer having a first glass transition temperature, and a second polymer that is substantially immiscible with the first polymer, the second polymer having a second glass transition temperature that is greater than the first glass transition temperature of the first polymer by at least about 10° C.;

in coordination with the printing of the support structure, printing the three-dimensional part from a part material with the extrusion-based additive manufacturing system using the layer-based additive manufacturing technique;

heating the printed support structure and the printed three-dimensional part to at least one temperature that is above a glass transition temperature of the part material, and that is below a glass transition temperature of at least one of the polymers of the support material; and cooling the heated support structure and the heated three-dimensional part.

2. The method of claim 1, wherein the second glass transition temperature of the second polymer is at least about 20° C. greater than the first glass transition temperature of the first polymer.

3. The method of claim 2, wherein the second glass transition temperature of the second polymer ranges from about 25° C. to about 50° C. greater than the first glass transition temperature of the first polymer.

4. The method of claim 1, wherein the support structure is printed to have a sprue hole; and wherein the method further comprises depositing additional part material through the sprue hole after at least a portion of the three-dimensional part is cooled.

5. The method of claim 1, wherein the at least two polymers comprise a copolymer polymerized from monomers selected from the group consisting of acrylic acid, ionic salts of acrylic acid, methacrylic acid, ionic salts of methacrylic acid, alkyl acrylates, alkyl methacrylates, and combinations thereof.

6. The method of claim 1, wherein the printing of the support structure using the layer-based additive manufacturing technique and the printing of the three-dimensional part using the layer-based additive manufacturing technique are performed to provide layers for the support structure and the three-dimensional part having substantially the same layer thicknesses.

7. The method of claim 1, wherein the printing of the support structure and the printing of the three-dimensional part are performed in a build chamber of the extrusion-based additive manufacturing system, and wherein heating the printed support structure and the printed three-dimensional part is performed in the build chamber.

8. A method for building a three-dimensional part, the method comprising:

providing a three-dimensional part and a support structure, wherein the three-dimensional part is printed from a part material using a layer-based additive manufacturing technique, and wherein the support structure is printed from a support material in coordination with the three-dimensional part using the layer-based additive manufacturing technique, the support material comprising:

a first polymer having a first glass transition temperature; and a second polymer that is substantially immiscible with the first polymer, the second polymer having a second glass transition temperature that is greater than the first glass transition temperature of the first polymer by at least about 10° C.;

heating the provided three-dimensional part and the support structure to at least one temperature that is above a glass transition temperature of the part material, that is above the first glass transition temperature of the first polymer of the support material, and that is below the second glass transition temperature of the second polymer of the support material; and cooling the heated three-dimensional part and the heated support structure.

9. The method of claim 8, wherein the second glass transition temperature of the second polymer is greater than the first glass transition temperature of the first polymer by at least about 20° C.

10. The method of claim 9, wherein the second glass transition temperature of the second polymer ranges from about 25° C. to about 50° C. greater than the first glass transition temperature of the first polymer.

11. The method of claim 8, and further comprising maintaining the heating for a duration ranging from about 2 hours to about 5 hours.

12. The method of claim 8, wherein the second polymer comprises a copolymer polymerized from monomers selected from the group consisting of acrylic acid, ionic salts of acrylic acid, methacrylic acid, ionic salts of methacrylic acid, alkyl acrylates, alkyl methacrylates, and combinations thereof.

13. The method of claim 8, wherein the first polymer comprises a terpolymer having a plurality of carboxyl groups, a plurality of phenyl groups, and a plurality of carboxylate ester groups.

14. A method for printing a three-dimensional part with an extrusion-based additive manufacturing system, the method comprising:

providing a support material to the extrusion-based additive manufacturing system, the support material comprising a first polymer having a first glass transition temperature and a second polymer that is substantially immiscible with the first polymer, and having a second glass transition temperature that is greater than the first glass transition temperature of the first polymer by at least about 10° C.;

providing a part material to the extrusion-based additive manufacturing system, the part material having a glass transition temperature that is less than the second glass transition temperature of the second polymer of the support material;

heating a build environment of the extrusion-based additive manufacturing system to at least one temperature that is above the glass transition temperature of the part material, that is above the first glass transition temperature of the first polymer of the support material, and that is below the second glass transition temperature of the second polymer of the support material;

printing a support structure in the heated build environment from the support material in coordination with printing the three-dimensional part in the heated build environment from the part material; and cooling the printed support structure and the printed three-dimensional part.

15. The method of claim 14, wherein the second glass transition temperature of the second polymer is greater than the first glass transition temperature of the first polymer by at least about 20° C.

16. The method of claim 15, wherein the second glass transition temperature of the second polymer ranges from about 25° C. to about 50° C. greater than the first glass transition temperature of the first polymer.

17. The method of claim 14, and further comprising at least partially dissolving the cooled support structure in an aqueous alkaline solution.

18. The method of claim 14, wherein the second polymer comprises a copolymer polymerized from monomers selected from the group consisting of acrylic acid, ionic salts of acrylic acid, methacrylic acid, ionic salts of methacrylic acid, alkyl acrylates, alkyl methacrylates, and combinations thereof.

\* \* \* \* \*